US011088751B2

(12) United States Patent
Davydov et al.

(10) Patent No.: US 11,088,751 B2
(45) Date of Patent: Aug. 10, 2021

(54) INTERFERENCE AWARE BEAM SELECTION FOR NR (NEW RADIO)

(71) Applicant: Apple Inc., Cupertino, CA (US)

(72) Inventors: Alexei Davydov, Nizhny Novgorod (RU); Victor Sergeev, Nizhny Novgorod (RU); Gregory V. Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 16/305,986

(22) PCT Filed: Jun. 5, 2017

(86) PCT No.: PCT/US2017/035904

§ 371 (c)(1),
(2) Date: Nov. 30, 2018

(87) PCT Pub. No.: WO2018/005014

PCT Pub. Date: Jan. 4, 2018

(65) Prior Publication Data

US 2019/0305838 A1 Oct. 3, 2019

Related U.S. Application Data

(60) Provisional application No. 62/357,746, filed on Jul. 1, 2016.

(51) Int. Cl.
*H04B 7/06* (2006.01)
*H04B 17/318* (2015.01)
(Continued)

(52) U.S. Cl.
CPC ........... *H04B 7/0695* (2013.01); *H04B 7/088* (2013.01); *H04B 17/318* (2015.01); *H04B 17/345* (2015.01)

(58) Field of Classification Search
CPC ...... H04B 7/0695; H04B 7/088; H04B 7/063; H04B 7/043; H04B 7/0456; H04B 7/0469;
(Continued)

(56) References Cited

U.S. PATENT DOCUMENTS

2013/0223251 A1* 8/2013 Li ........................ H04B 7/0619 370/252
2014/0112269 A1* 4/2014 Yu ........................ H04L 5/0035 370/329
(Continued)

FOREIGN PATENT DOCUMENTS

WO 2016086144 A1 6/2016

OTHER PUBLICATIONS

International Search Report and Written Opinion dated Aug. 17, 2017 for PCT Application PCT/US2017/035904.

*Primary Examiner* — Yemane Mesfin
*Assistant Examiner* — Mon Cheri S Davenport
(74) *Attorney, Agent, or Firm* — Eschweiler & Potashnik, LLC

(57) ABSTRACT

Techniques for interference-based beam selection are discussed. One example embodiment employable in a UE (User Equipment) can comprise a processor configured to: determine one or more parameters based on configuration signaling, wherein each of the one or more parameters is associated with at least one of channel measurements, interference measurements, or a beam information report; perform the interference measurements for each of one or more distinct UE beams; calculate a measurement metric for each beam pair of one or more beam pairs based on the interference measurements, wherein each beam pair comprises one of the one or more distinct UE beams and an associated NW (Network) beam; and generate the beam information report
(Continued)

comprising the measurement metric for at least one beam pair of the one or more beam pairs.

22 Claims, 11 Drawing Sheets

(51) Int. Cl.
*H04B 17/345* (2015.01)
*H04B 7/08* (2006.01)

(58) Field of Classification Search
CPC .. H04B 7/0632; H04B 17/318; H04B 17/382; H04B 17/12; H04B 17/336; H04B 17/345; H04B 7/04; H04B 7/0413; H04B 7/0628; H04B 7/0874; H04B 17/102; H04B 7/0617; H04B 7/0639; H04W 52/245; H04W 16/28; H04W 24/10; H04W 52/241; H04W 72/046; H04W 8/22; H01Q 3/2605
See application file for complete search history.

(56) References Cited

U.S. PATENT DOCUMENTS

2018/0132125 A1* 5/2018 Li .......................... H04W 24/10
2019/0104549 A1* 4/2019 Deng ................... H04B 7/0617

* cited by examiner

INTERFERENCE AWARE BEAM SELECTION FOR NR (NEW RADIO)

REFERENCE TO RELATED APPLICATIONS

This application is a National Phase entry application of International Patent Application No. PCT/US2017/035904 filed on Jun. 5, 2017, which claims priority to U.S. Provisional Application 62/357,746 filed on Jul. 1, 2016, entitled "INTERFERENCE AWARE BEAM SELECTION FOR NEW RADIO TECHNOLOGY" in the name of Alexei Davydov et al. and is hereby incorporated by reference in its entirety.

FIELD

The present disclosure relates to wireless technology, and more specifically to techniques and associated codebook structure(s) that can enable beam selection for NR (New Radio) based on interference.

BACKGROUND

In cellular systems, when a mobile UE (User Equipment) moves from one cell to another cell and performs cell selection/reselection and handover, it also performs radio resource management (RRM) measurements of the reference signal quality transmitted by the neighboring cells. In the current LTE (Long Term Evolution) systems, a UE reports two parameters using reference signals: RSRP (Reference Signal Received Power) and RSRQ (Reference Signal Received Quality), which are defined in 3GPP (Third Generation Partnership Project) TS (Technical Specification) 36.214 v.12.5.0.

DETAILED DESCRIPTION

Figure 1:
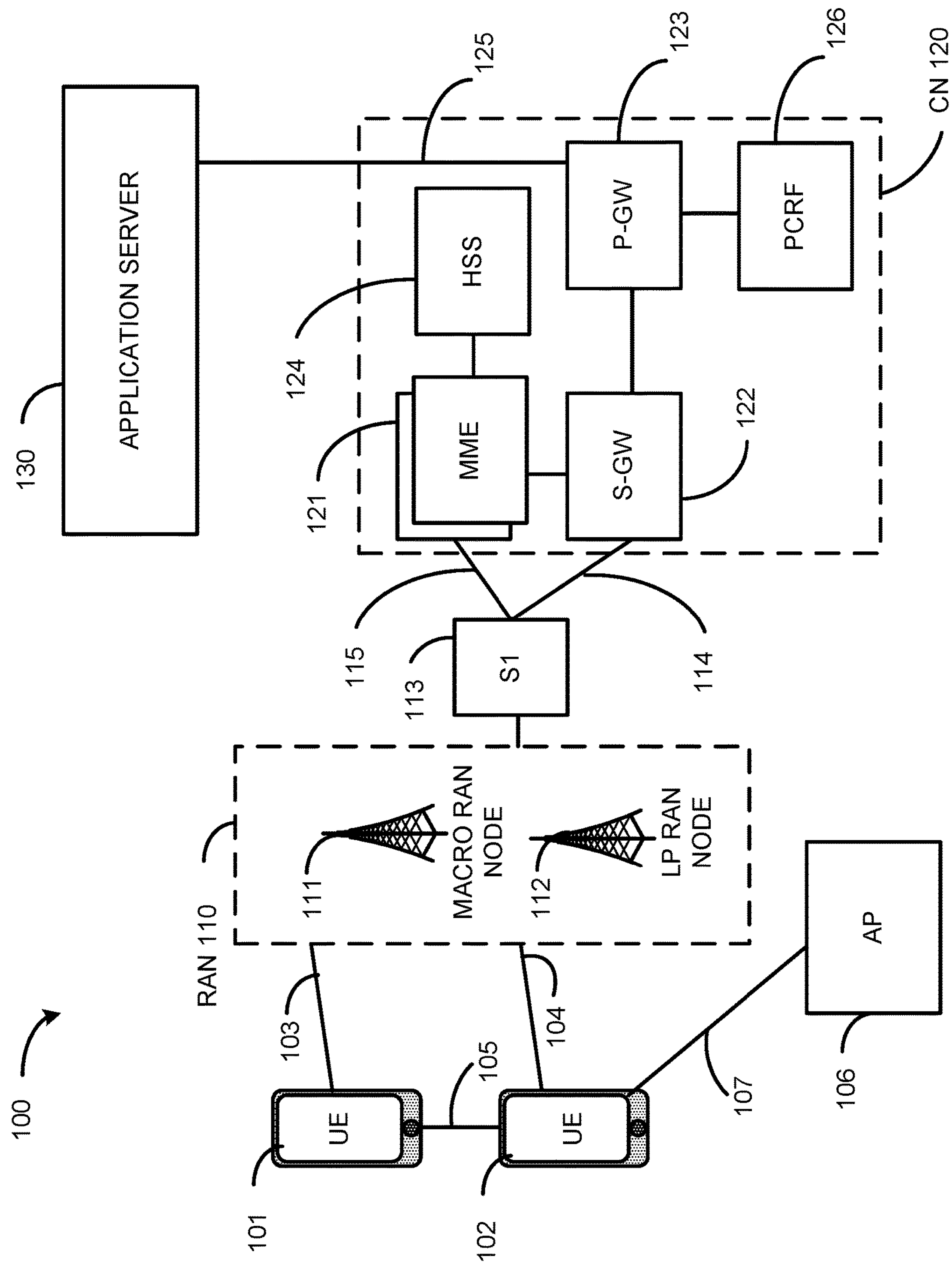
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
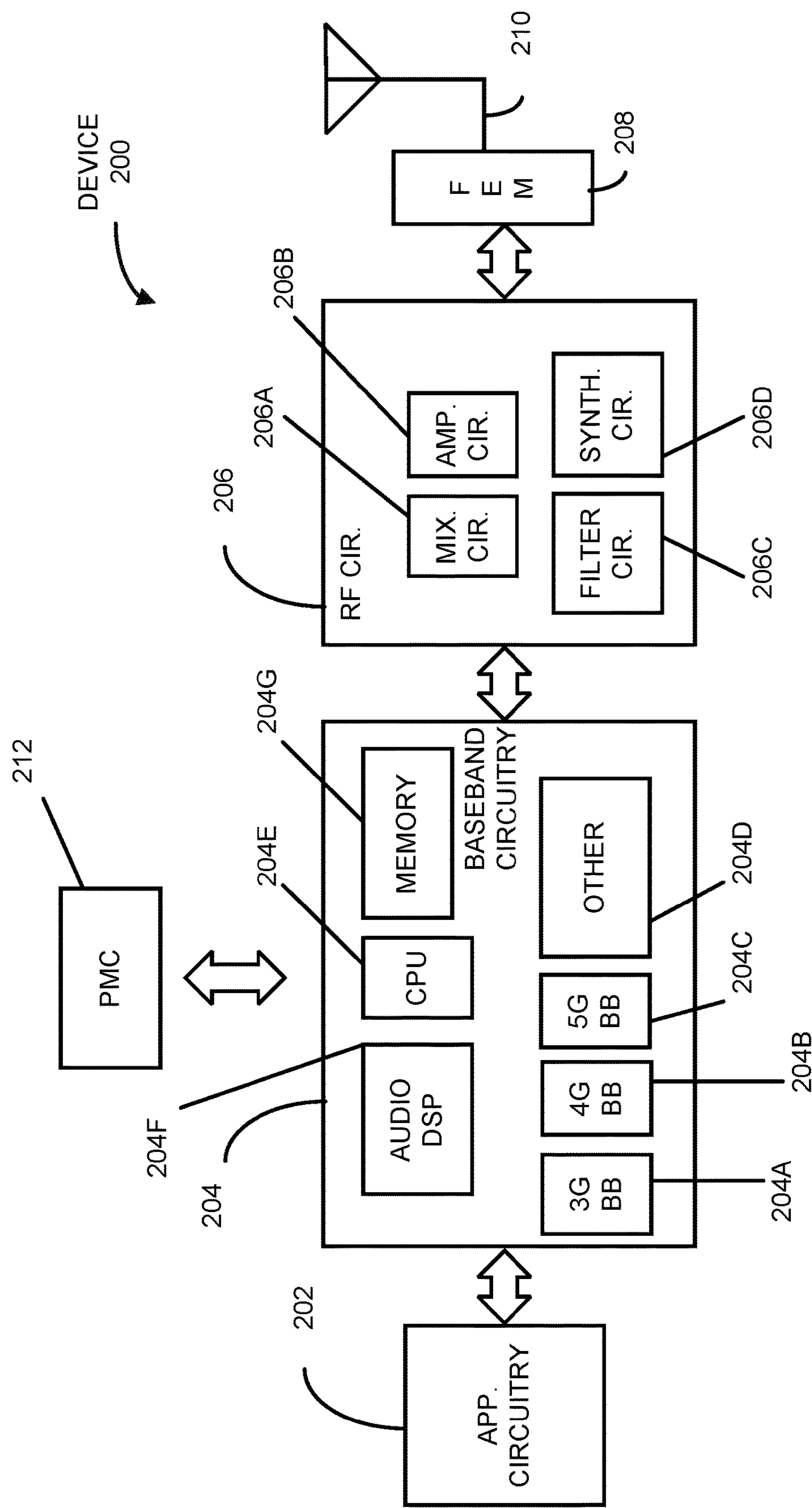
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206*a*, amplifier circuitry 206*b* and filter circuitry 206*c*. In some embodiments, the transmit signal path of the RF circuitry 206 may include filter circuitry 206*c* and mixer circuitry 206*a*. RF circuitry 206 may also include synthesizer circuitry 206*d* for synthesizing a frequency for use by the mixer circuitry 206*a* of the receive signal path and the transmit signal path. In some embodiments, the mixer circuitry 206*a* of the receive signal path may be configured to down-convert RF signals received from the FEM circuitry 208 based on the synthesized frequency provided by synthesizer circuitry 206*d*. The amplifier circuitry 206*b* may be configured to amplify the down-converted signals and the filter circuitry 206*c* may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206*a* of the receive signal path may comprise passive mixers, although the scope of the embodiments is not limited in this respect.

In some embodiments, the mixer circuitry 206*a* of the transmit signal path may be configured to up-convert input baseband signals based on the synthesized frequency provided by the synthesizer circuitry 206*d* to generate RF output signals for the FEM circuitry 208. The baseband signals may be provided by the baseband circuitry 204 and may be filtered by filter circuitry 206*c*.

In some embodiments, the mixer circuitry 206*a* of the receive signal path and the mixer circuitry 206*a* of the transmit signal path may include two or more mixers and may be arranged for quadrature downconversion and upconversion, respectively. In some embodiments, the mixer circuitry 206*a* of the receive signal path and the mixer circuitry 206*a* of the transmit signal path may include two or more mixers and may be arranged for image rejection (e.g., Hartley image rejection). In some embodiments, the mixer circuitry 206*a* of the receive signal path and the mixer circuitry 206*a* may be arranged for direct downconversion and direct upconversion, respectively. In some embodiments, the mixer circuitry 206*a* of the receive signal path and the mixer circuitry 206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206*d* may be a fractional-N synthesizer or a fractional N/N+1 synthesizer, although the scope of the embodiments is not limited in this respect as other types of frequency synthesizers may be suitable. For example, synthesizer circuitry 206*d* may be a delta-sigma synthesizer, a frequency multiplier, or a synthesizer comprising a phase-locked loop with a frequency divider.

The synthesizer circuitry 206*d* may be configured to synthesize an output frequency for use by the mixer circuitry 206*a* of the RF circuitry 206 based on a frequency input and a divider control input. In some embodiments, the synthesizer circuitry 206*d* may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206*d* of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
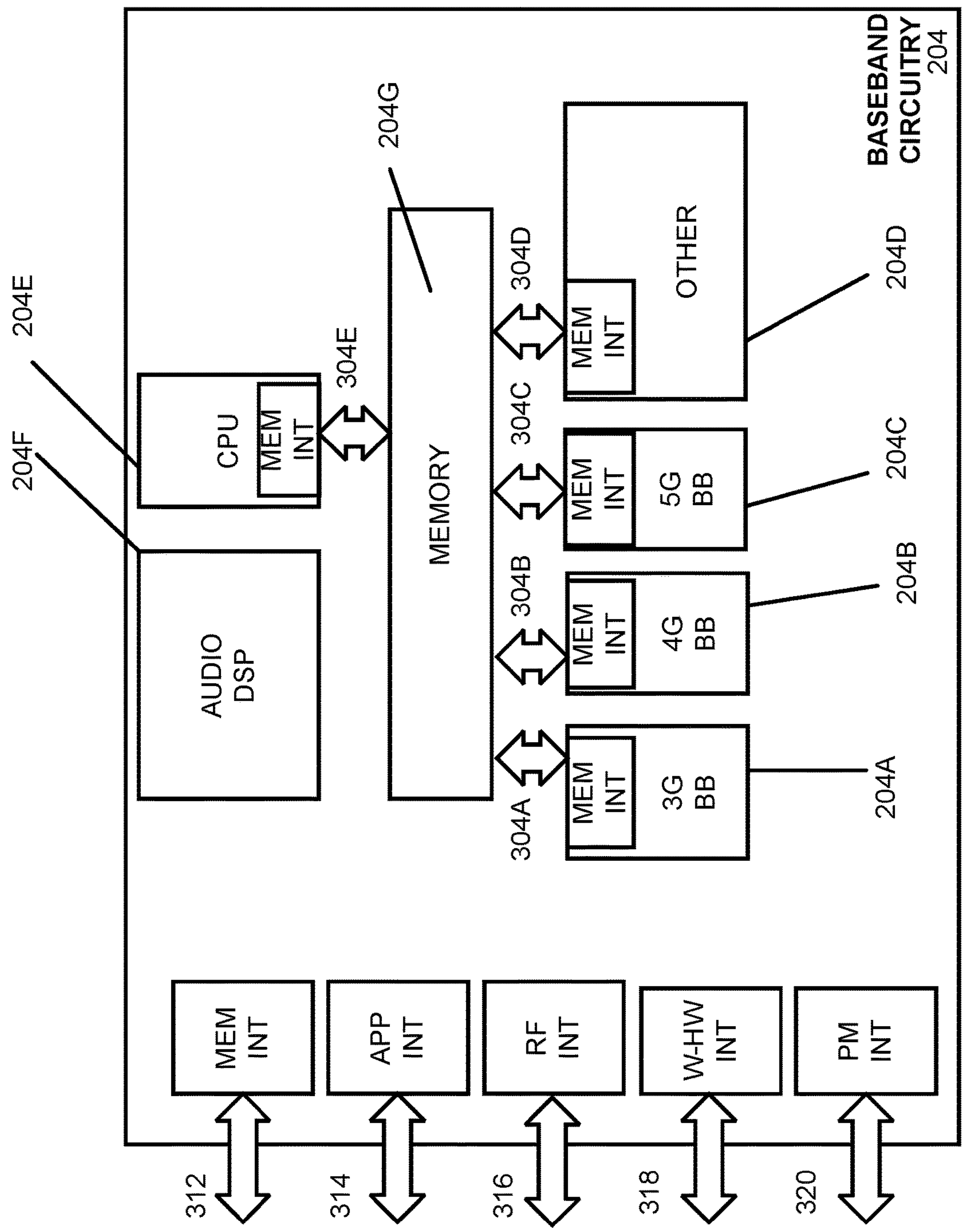
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

In various aspects, techniques discussed herein can be employed to facilitate RSRQ (or SINR (Signal-to-Interference-plus-Noise Ratio)-like) beam selection in 5G (Fifth Generation) systems, where the NW (Network) and UE beam pair selection can be carried out taking into account the interference. The RSSI (Received Signal Strength Indicator) or other interference measurement for SINR can be conditioned on the NW and UE beams and can be used to capture interference levels, for example, from neighboring TPs (Transmission Points). In some aspects, the RSSI or other interference measurement can be carried out outside of a measurement subframe, which can capture a realistic interference load of the systems.

Figure 4:
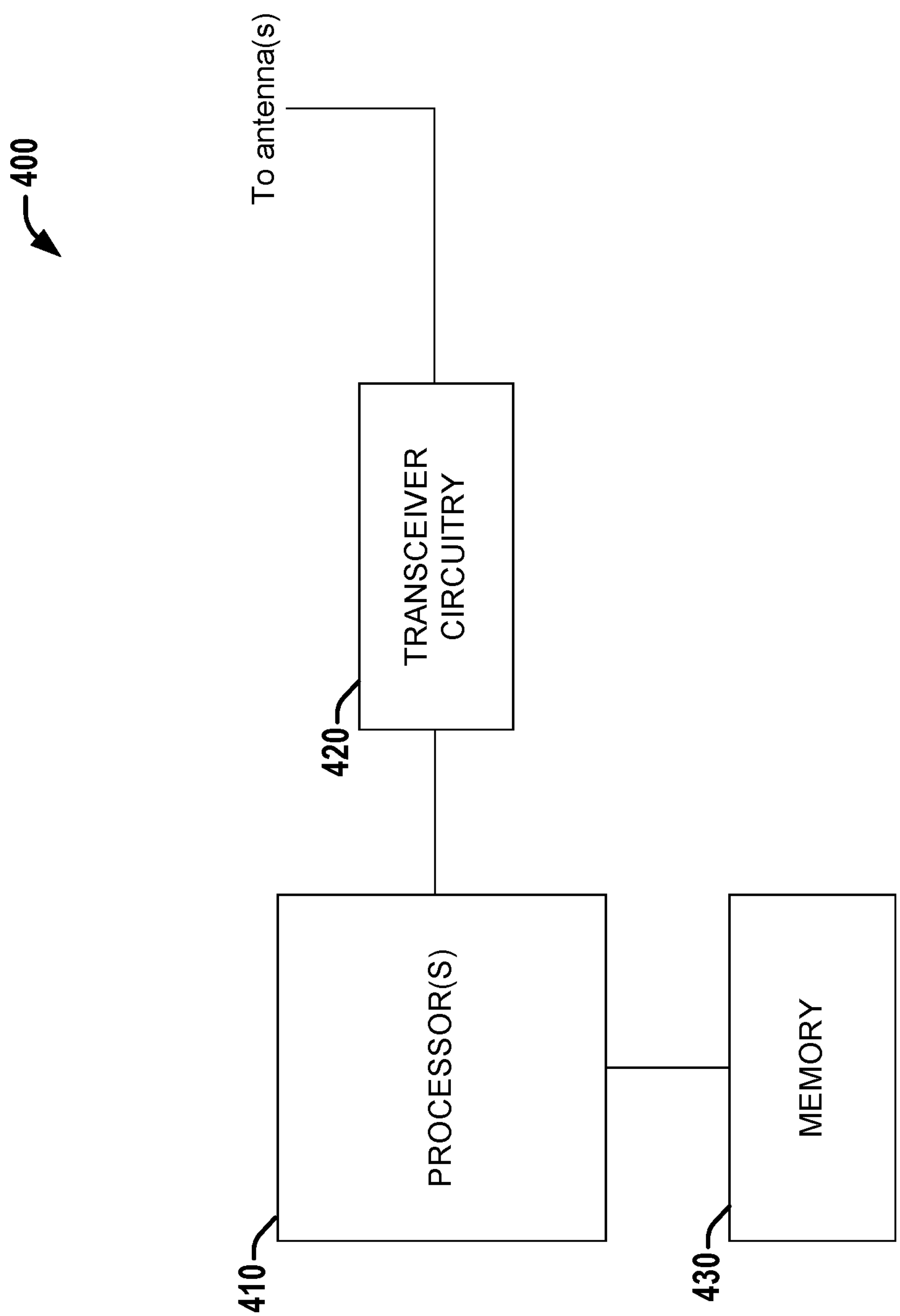
FIG. 4 is a block diagram illustrating a system employable at a UE (User Equipment) that facilitates interference aware beam selection techniques, according to various aspects described herein.

Referring to FIG. 4, illustrated is a block diagram of a system 400 employable at a UE (User Equipment) that facilitates interference aware beam selection techniques, according to various aspects described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate beam selection (e.g., for 5G NR) at a UE based on RSRQ or another SINR-like measure that takes into account interference.

Figure 5:
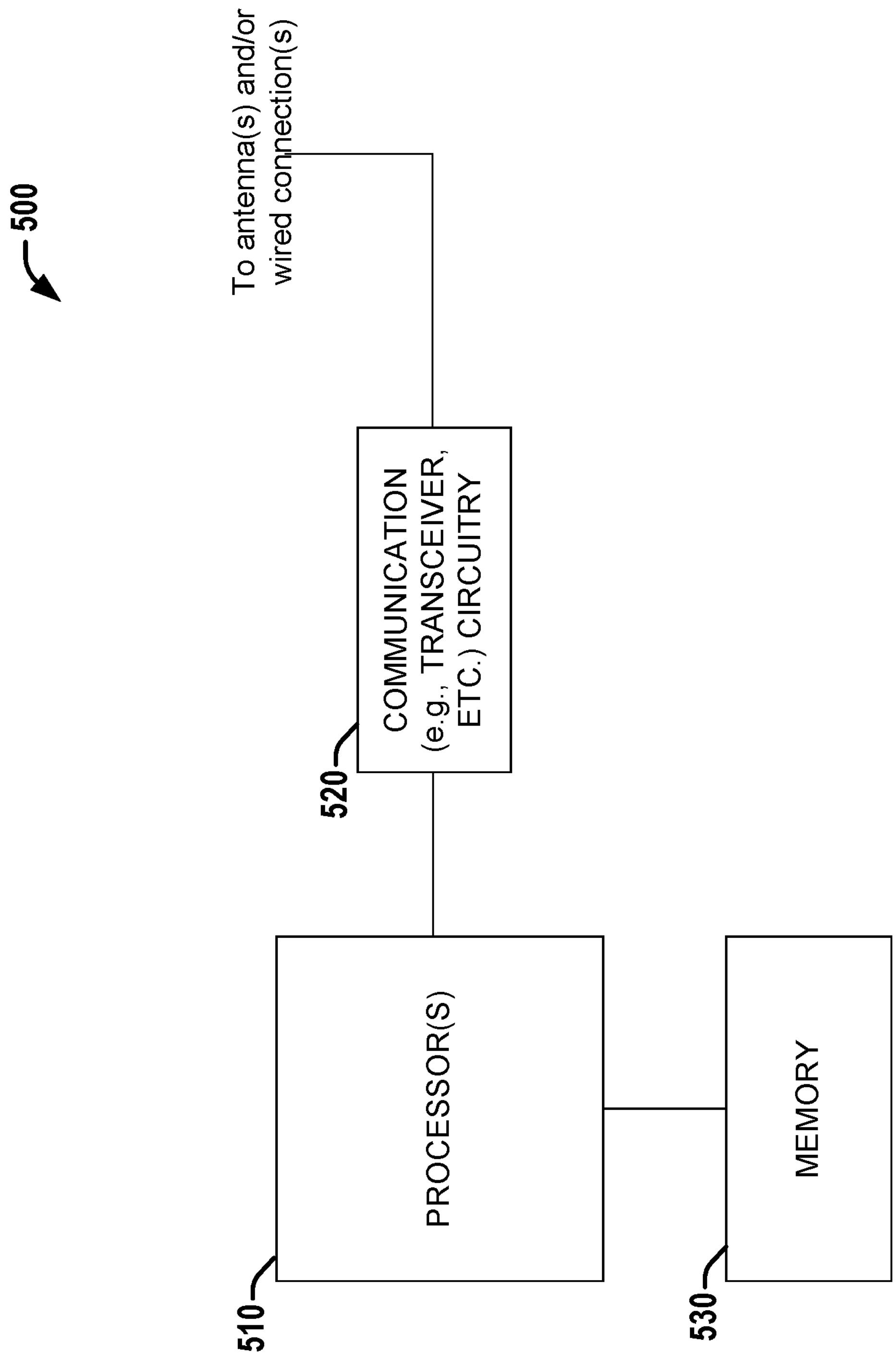
FIG. 5 is a block diagram illustrating a system employable at a BS (Base Station) that facilitates interference aware beam selection techniques, according to various aspects described herein.

Referring to FIG. 5, illustrated is a block diagram of a system 500 employable at a BS (Base Station) that facilitates interference aware beam selection techniques, according to various aspects described herein. System 600 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB) or other base station (e.g., gNB (next generation Node B)) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate beam selection (e.g., for 5G NR) at a BS (e.g., eNB, gNB) based on RSRQ or another SINR-like measure that takes into account interference.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

RSRP (Reference Signal Receive Power) can provide information about signal power from a specific cell while excluding noise and interference from other cells. Conventional RSRP levels for usable signals typically range from about −70 dBm close to an LTE cell site to about −125 dBm at the cell-edge. RSRP can be defined as the average power of Resource Elements (RE) that carry cell specific Reference Signals (RS) over the entire bandwidth, that is, RSRP is only measured in the symbols carrying RS. For RSRP, a UE can measure (e.g., via processor(s) 410) the power of multiple resource elements used to transmit the reference signal (e.g., which can be generated by processor(s) 510, transmitted by communication circuitry 520, and received via transceiver circuitry 420) and the UE can take an average (e.g., via processor(s) 410) of them. The reporting range for RSRP supported by LTE signaling is currently defined as −44 to −140 dBm.

RSRQ (Reference Signal Received Quality) is a measure of link quality that also considers RSSI (Received Signal Strength Indicator) and the number of used Resource Blocks (N). RSRQ can be defined as RSRQ=(N*RSRP)/RSSI, where RSRP and RSSI can be measured over the same bandwidth (e.g., via processor(s) 410 of signals and/or interference received via transceiver circuitry 420). RSRQ can also be considered a SINR-type of measurement, as it indicates the quality of the received reference signal including interference contribution. The RSRQ measurement includes interference contribution in RSSI and also provides information about loading of the channel, which can be useful for inter-frequency handover or cell reselection, where RSRP information is typically insufficient to make a reliable decision. The interference level can be included in RSRQ via RSSI measurements (e.g., via processor(s) 410 of signals an interference received via transceiver circuitry 420) that can contain information about the average total received power observed, for example, in symbols (e.g., OFDM (Orthogonal Frequency Division Multiplexing) symbols, OFDMA (Orthogonal Frequency Division Multiple Access) symbols, etc.) containing reference symbols for antenna port 0 (e.g., symbols 0 and 4 in a slot) in the measurement bandwidth over N resource blocks. The total received power of the RSSI can include the power from co-channel serving and non-serving interfering cells, adjacent channel interference, thermal noise, etc.

The LTE (Long Term Evolution) specification provides the flexibility of using RSRP, RSRQ, or both to assist handover decisions. RSRP and RSRQ can be measured over the same bandwidth, either narrowband (e.g., with N=62 Sub Carriers (6 Resource Blocks)) or wideband (e.g., N=full bandwidth (up to 100 Resource Blocks/20 MHz)).

Figure 6:
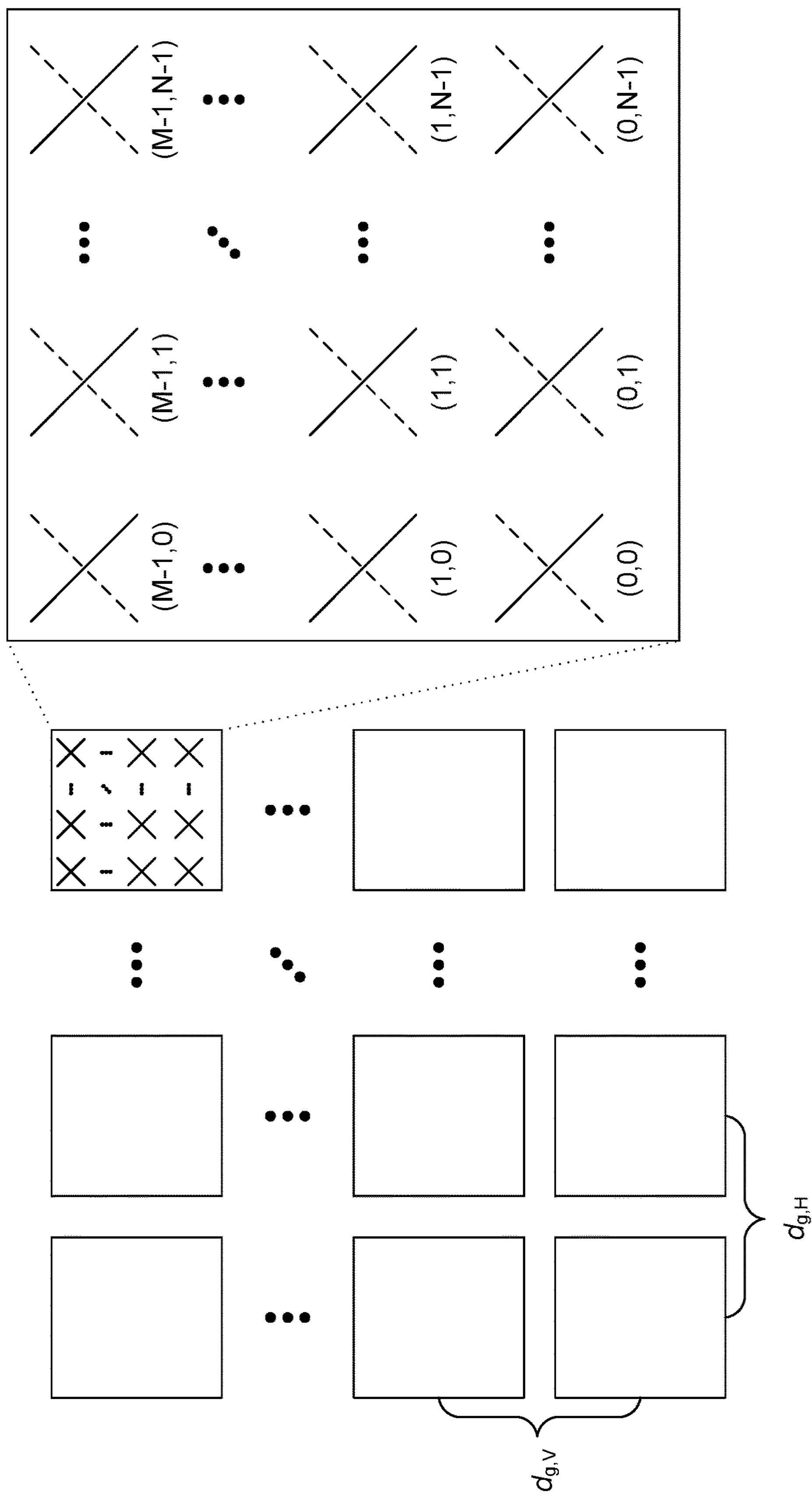
FIG. 6 is a diagram illustrating an example panel array according to a NR antenna model, which can be employed in connection with various aspects discussed herein.

In NR, the antenna model at the UE can comprise a large number of antenna elements. Referring to FIG. 6, illustrated is a diagram showing an example panel array according to a NR antenna model, which can be employed in connection with various aspects discussed herein. In the NR antenna mode, the antenna elements at the UE (e.g., a UE employing system 400) can be grouped into a 1D (one dimensional) or 2D (two dimensional) array of one or more antenna panels, each of which can have uniform antenna spacing (e.g., the antenna panel shown at the top right of the panel array, comprising M×N antenna elements for each of two distinct polarizations). The antenna spacing between antenna panels can be non-uniform.

Figure 7:
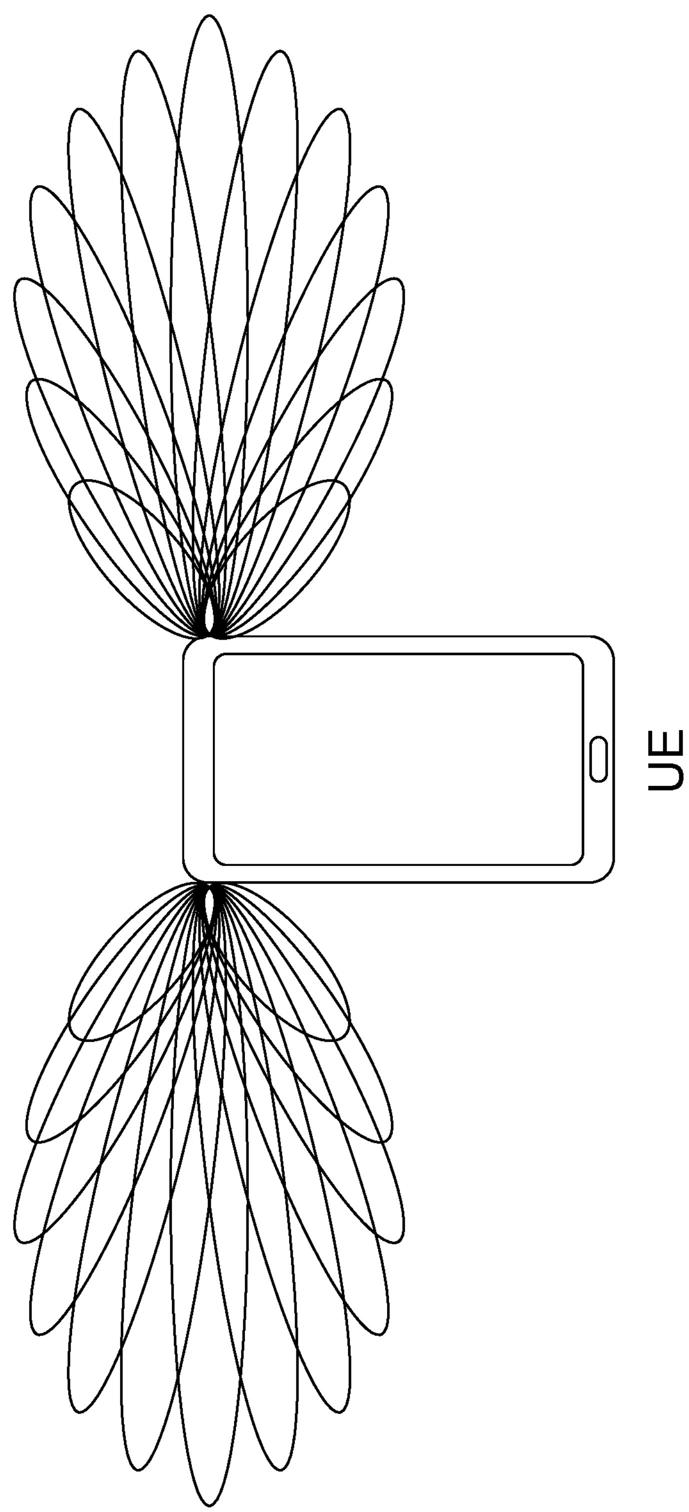
FIG. 7 is a diagram illustrating an example UE with two antenna panels (and associated antenna patterns) that can be employed in connection with various aspects described herein.

In order to provide full coverage, a UE (e.g., a UE employing system 400) can be equipped with multiple antenna panels pointing in various directions (e.g., opposite directions). Referring to FIG. 7, illustrated is a diagram showing an example UE with two antenna panels (and associated antenna patterns) that can be employed in connection with various aspects described herein. As can be seen in FIG. 7, two panels can be used to provide wider angular coverage for the UE antennas. Although FIG. 7 illustrates an example UE with two antenna panels, in other aspects, more than two antenna panels can be used at the UE. For example, in various aspects, a UE employing system 400 can have N antenna panels (e.g., where N can be any positive integer).

Figure 8:
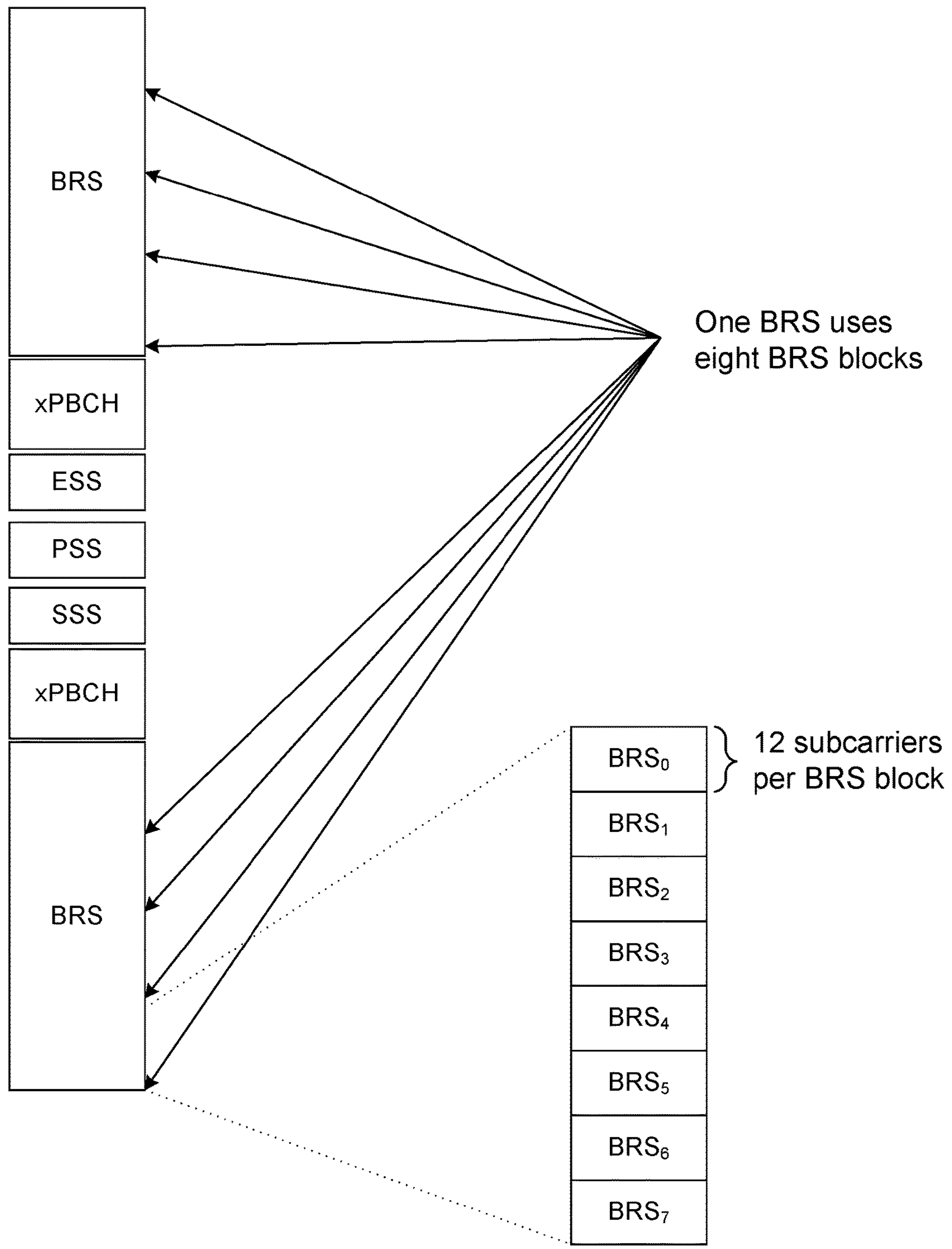
FIG. 8 is a diagram illustrating an example measurement subframe that can be employed in connection with various aspects described herein.

One conventional approach to support beam selection is based on RSRP measurements. The RSRP measurement can be carried out on the measurement subframe using beam reference signals (e.g., generated by processor(s) 510, transmitted via communication circuitry 520, received via transceiver circuitry 420, and measured by processor(s) 410). Referring to FIG. 8, illustrated is a diagram of an example measurement subframe that can be employed in connection with various aspects described herein. The example measurement subframe can have BRS (Beamforming Reference Signals), and can also include a PBCH (Physical Broadcast Channel, such as xPBCH (5G PBCH)), and one or more synchronization signals (e.g., ESS (Extended Synchronization Signal(s)), PSS (Primary Synchronization Signal(s)), SSS (Secondary Synchronization Signal(s)), etc.).

A UE can select one or more UE beams (e.g., via processor(s) 410 selecting associated beamforming weights, etc.) and can report the corresponding NW beam Rx (Receive) power(s) using RSRP (e.g., in a report (e.g., beam information report) generated by processor(s) 410 and transmitted via transceiver circuitry 420, which can be received via communication circuitry 520 and processed by processor(s) 510). Table 1, below, shows example RSRP measurements that can be reported for some NW and UE beams in one example scenario. In Table 1, the selected UE beams, NW beams, and corresponding RSRP measurements are underlined.

TABLE 1

Example RSRP Measurements for Different Beam Pairs for Beam Selection

| BRS-RP | | NW Beams | | | | | | |
|---|---|---|---|---|---|---|---|---|
| | | N1 | N2 | N3 | N4 | N5 | N6 | N7 |
| UE Beams | U1 | | | | | | −72 | −82 |
| | U2 | | | −76 | | | | |
| | U3 | | −79 | −70 | −74 | | | |
| | U4 | | | −83 | | | | |
| | U5 | | | | | | | |

Due to the large number of antenna elements and relative small beam width, the interference at the UE can be significantly different for different beam settings at the UE. As the result, the existing beam selection based on the RSRP may be insufficient to judge link quality.

In various aspects, RSRQ (or SINR-like) based beam selection can be employed (e.g., in 5G NR systems, etc.), where the NW and UE beam pair selection (e.g., by processor(s) 410) can take into account the interference. In various embodiments, RSSI measurements for RSRQ (or interference measurement for SINR) can be carried out (e.g., by processor(s) 410 based on signals/interference received via transceiver circuitry 420) conditioned on the UE beam(s). Tables 2 and 3, below, provide example RSRP measurements and associated RSRQ measurements for an example scenario wherein techniques discussed herein can be employed.

TABLE 2

Example RSRP Values for Different Beam Pairs for Beam Selection

| BRS-RP | | NW Beams N1 | N2 | N3 | N4 | N5 | N6 | N7 |
|---|---|---|---|---|---|---|---|---|
| UE Beams | U1 | | | | | | | −85 |
| | U2 | | | −76 | | | −85 | −83 |
| | U3 | | −79 | −70 | −74 | | | −83 |
| | U4 | | | −83 | | | | |
| | U5 | | | | | | | |

TABLE 3

Example RSRQ Values for Different Beam Pairs for Beam Selection

| BRS-RP | | NW Beams N1 | N2 | N3 | N4 | N5 | N6 | N7 |
|---|---|---|---|---|---|---|---|---|
| UE Beams | U1 | | | | | | | −3 |
| | U2 | | | −5 | | | −7 | −5 |
| | U3 | | −17 | −8 | −12 | | | −20 |
| | U4 | | | −12 | | | | |
| | U5 | | | | | | | |

As can be seen in Tables 2 and 3, based on RSRP measurements, the optimal beam pair appears to be N3 and U3. However, due to different interference levels for different UE beams (U1 to U5) the optimal beam from the RSRQ measurements is different than from the RSRP measurements, and corresponds to the N7 and U2 beam pair.

Figure 9:
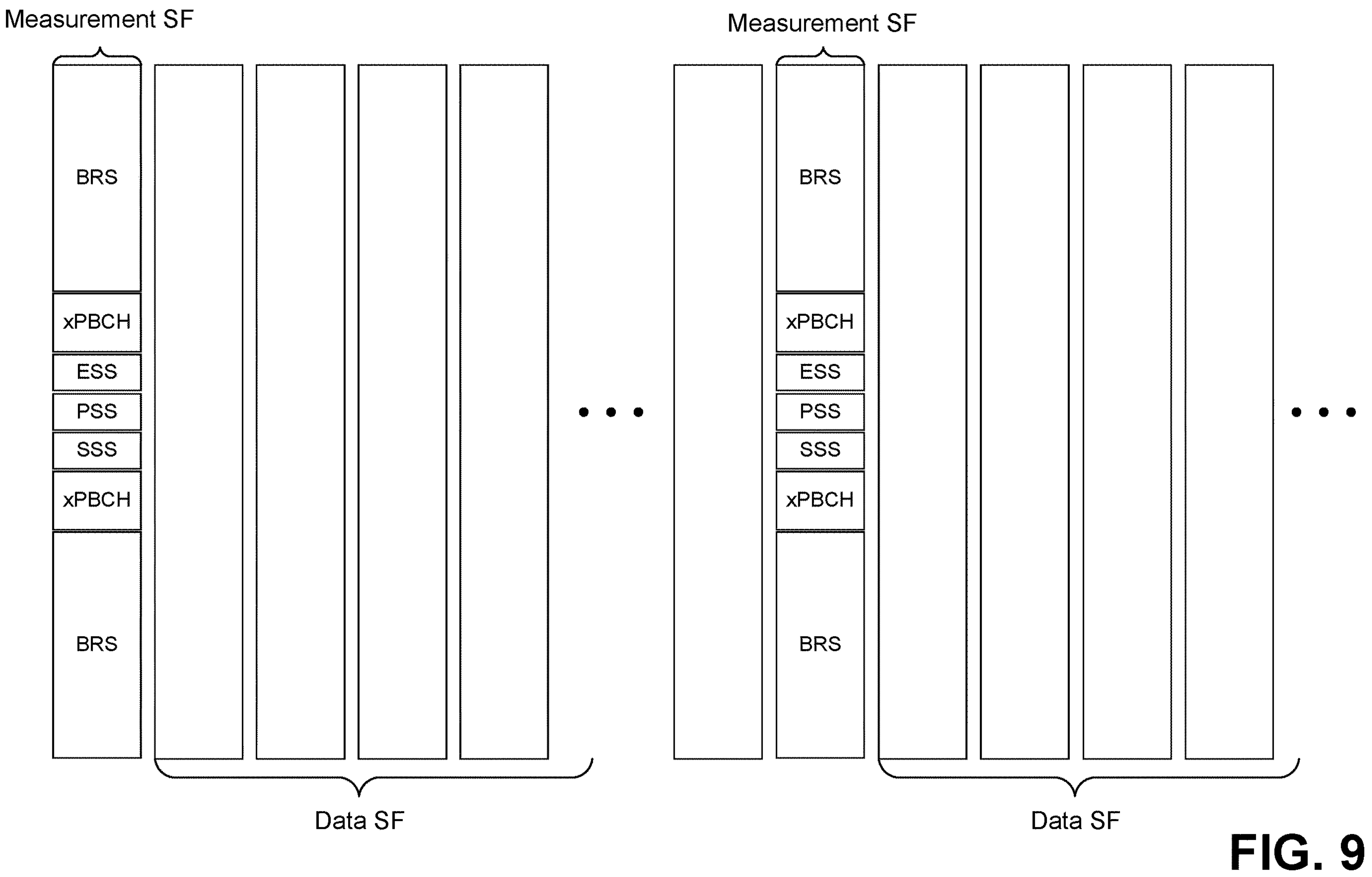
FIG. 9 is a diagram illustrating an example set of subframes comprising measurement subframes and data subframes in connection with various aspects discussed herein.

In various aspects, the RSSI measurements (or other interference measurement(s)) can be carried out by the UE (e.g., with measurements determined by processor(s) 410 based on signals and/or interference received via transceiver circuitry 420) in the subframes outside of the measurement subframes (SF), for example, in data subframes (SF), as shown in FIG. 9, which illustrates an example set of subframes comprising measurement subframes and data subframes in connection with various aspects discussed herein. Carrying out RSSI measurements (or other interference measurement(s)) outside of measurement SFs can facilitate interference measurement that measures the physical data channel.

In various aspects, RSRQ reporting for beam selection can be periodic or triggered by an event. In both scenarios, the UE can report the measured RSRQ and the corresponding NW and UE beam indexes (e.g., in a report (e.g., beam information report) generated by processor(s) 410, transmitted by transceiver circuitry 420, received by communication circuitry 520, and processed by processor(s) 520).

Figure 10:
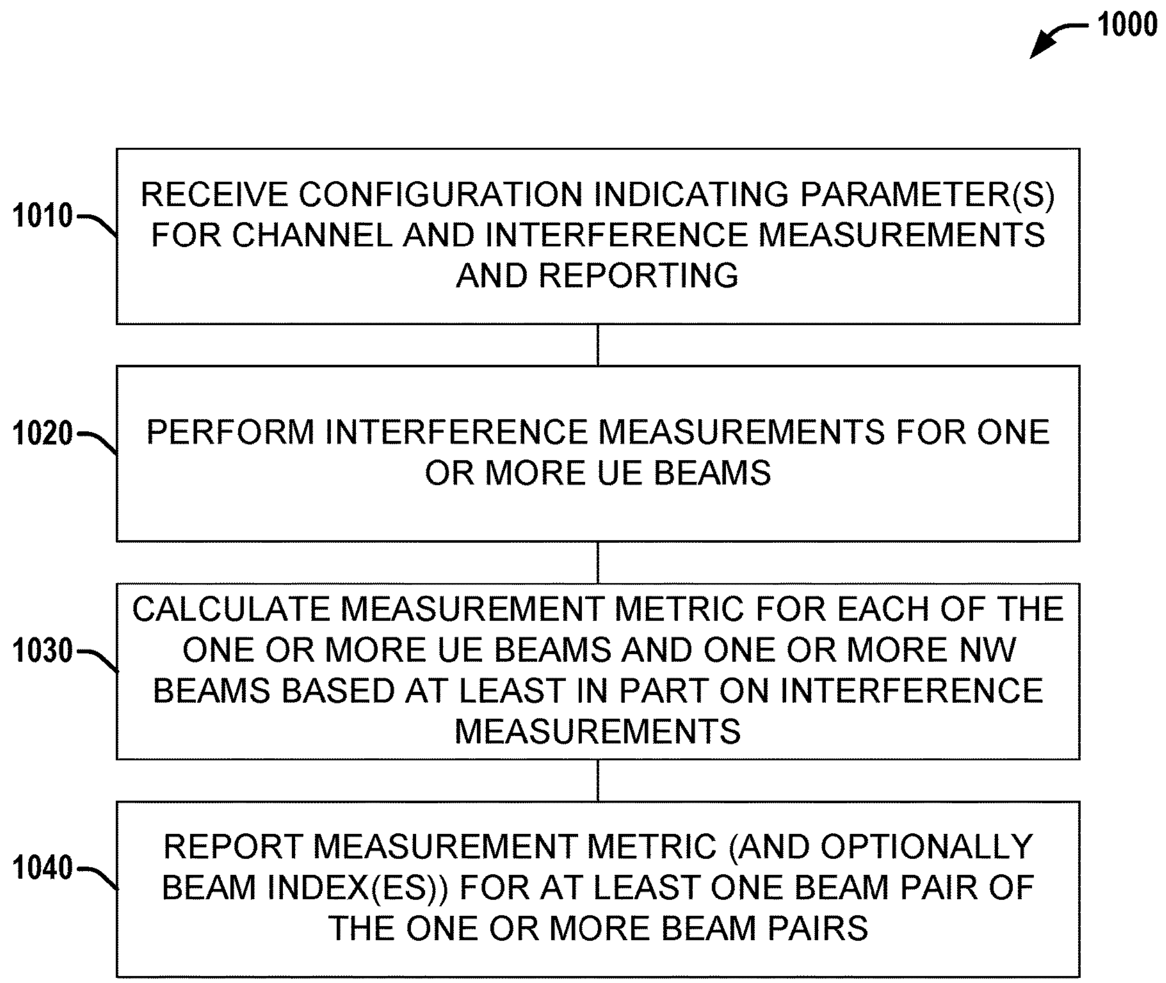
FIG. 10 is a flow diagram of an example method employable at a UE that facilitates beam selection based on interference measurements, according to various aspects discussed herein.

Referring to FIG. 10, illustrated is a flow diagram of an example method 1000 employable at a UE that facilitates beam selection based on interference measurements, according to various aspects discussed herein. In other aspects, a machine readable medium can store instructions associated with method 1000 that, when executed, can cause a UE to perform the acts of method 1000.

At 1010, configuration can be received indicating one or more parameters for channel and interference measurements and associated reporting.

At 1020, interference measurements can be performed for one or more UE beams (e.g., one or more selected UE beams).

At 1030, a measurement metric can be calculated for each of one or more beam pairs based at least in part on the interference measurements, wherein each beam pair comprises a UE beam of the one or more UE beams.

At 1040, the measurement metric for at least one beam pair can be reported to a serving TP along with beam information corresponding to each beam pair of the at least beam pair (e.g., a beam index of a TP beam and/or UE beam of that beam pair).

Additionally or alternatively, method 1000 can include one or more other acts described herein in connection with system 400.

Figure 11:
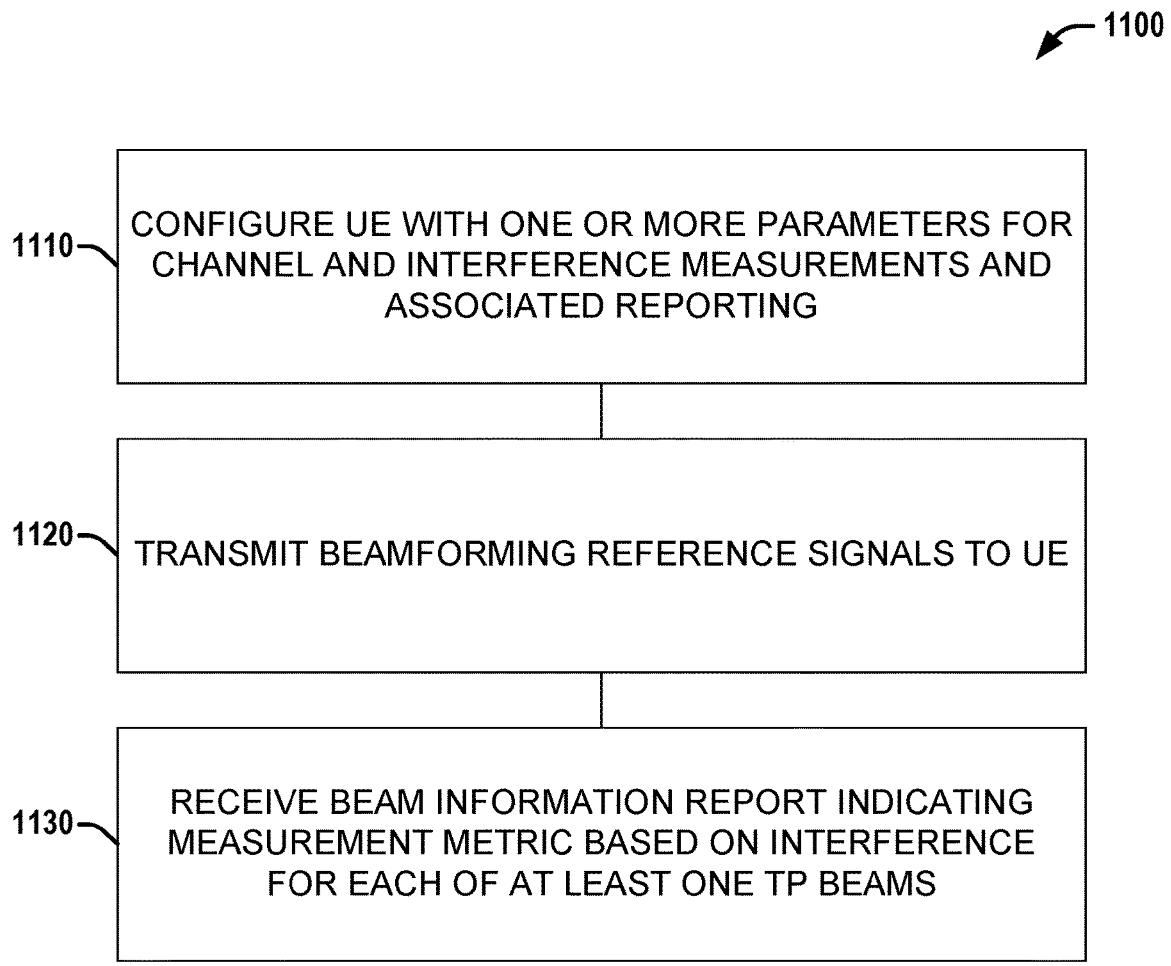
FIG. 11 is a flow diagram of an example method employable at a BS that facilitates beam selection based on interference measurements, according to various aspects discussed herein.

Referring to FIG. 11, illustrated is a flow diagram of an example method 1100 employable at a BS that facilitates beam selection based on interference measurements, according to various aspects discussed herein. In other aspects, a machine readable medium can store instructions associated with method 1100 that, when executed, can cause a BS to perform the acts of method 1100.

At 1110, configure a UE with one or more parameters for channel and interference measurements and associated reporting.

At 1120, a set of beamforming reference signals can be transmitted via each of one or more TP beams.

At 1130, a beam information report can be received that indicates an measurement metric for at least one TP beam and an associated beam index for each TP of the at least one TP beam.

Additionally or alternatively, method 1100 can include one or more other acts described herein in connection with system 600.

In a first example technique, beam selection by a UE (e.g., employing system 400) and reporting by the UE to a BS (e.g., employing system 500) can be based on interference measurement(s) for different beamforming. The first example technique can include configuration of the UE of parameters for channel and interference measurements and reporting, for example, via a serving TP (Transmission Point) generating (e.g., via processor(s) 510) configuration signaling (e.g., higher layer (e.g., RRC (Radio Resource Control)) signaling, a SIB (System Information Block), MIB (Master Information Block), etc.) that can be transmitted (e.g., via communication circuitry 520) to a UE that can receive (e.g., via transceiver circuitry 420) the configuration signaling and determine (e.g., via processor(s) 410) the parameter(s) based on the configuration signaling. The UE can perform interference measurements (e.g., via processor(s) 410) for one or more UE beams and supported at the UE (e.g., based on signal(s) and/or interference received via transceiver circuitry 420) in connection with one or more NW beams. Based on the interference measurement(s) for the UE beam(s) and NW beam(s), the UE can calculate (e.g., via processor(s) 410) a measurement metric (e.g., RSRQ, etc.) that can be evaluated (e.g., by processor(s) 410) in connection with a measurement reporting condition. The UE can report (e.g., in a report (e.g., beam information report) generated by processor(s) 410, transmitted via transceiver circuitry 420, received via communication circuitry 520, and processed by processor(s) 510) the measurement metric to the serving TP along with UE beam information corresponding to a beam that was used at the UE for interference measurements (e.g., an index of a NW beam of a best beam pair as determined by processor(s) 410 based on the measurement metric, etc.).

In various aspects of the first example technique, the interference measurements can comprise a RSSI (Received Signal Strength Indicator).

In various aspects of the first example technique, the measurement metric can be a RSRQ (Reference Signal Received Quality), which can equal a ratio of RSRP (Reference Signal Received Power) to the Received Signal Strength Indicator (RSSI), where RSRP can be measured (e.g., by processor(s) 410 on signals received via transceiver circuitry 420) for a given beam pair comprising a given serving TP beam and a given UE beam, and wherein the RSSI can be measured (e.g., by processor(s) 410 on signals and/or interference received via transceiver circuitry 420) for the given UE beam.

In various aspects of the first example technique, the measurement metric can be a SINR (Signal-to-Interference-plus-Noise Ratio), wherein a signal power and an interference noise power can be measured (e.g., by processor(s) 410 on signals and/or interference received via transceiver circuitry 420) based on the same UE beam.

In various aspects of the first example technique, the measurement of interference can be performed by the UE (e.g., by processor(s) 410 on signals and/or interference received via transceiver circuitry 420) on a selected set of time resources. In various such aspects, the selected set of time resources can comprise subframes not carrying periodic reference signals (e.g., data subframes). Additionally or alternatively, in various such aspects, the selected set of time resources can be configured by the serving TP (e.g., via higher layer signaling (e.g., RRC (Radio Resource Control), etc.) generated by processor(s) 510, transmitted via communication circuitry 520, received via transceiver circuitry 420, and processed by processor(s) 410).

In various aspects of the first example technique, along with the measurement metric, the UE can report (e.g., in a report (e.g., beam information report) generated by processor(s) 410, transmitted via transceiver circuitry 420, received via communication circuitry 520, and processed by processor(s) 510) beam index(es) of the UE and NW beams associated with that measurement metric to the serving TP.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: a memory interface; and processing circuitry configured to: determine one or more parameters based on configuration signaling, wherein each of the one or more parameters is associated with at least one of channel measurements, interference measurements, or a beam information report; perform the interference measurements for each of one or more distinct UE beams; calculate a measurement metric for each beam pair of one or more beam pairs based on the interference measurements, wherein each beam pair comprises one of the one or more distinct UE beams and an associated NW (Network) beam; generate the beam information report comprising the measurement metric for at least one beam pair of the one or more beam pairs; and send the one or more parameters to a memory via the memory interface.

Example 2 comprises the subject matter of any variation of any of example(s) 1, wherein the interference measurements for each of the one or more distinct UE beams comprise RSSI (Received Signal Strength Indicator) measurements for each of the one or more distinct UE beams.

Example 3 comprises the subject matter of any variation of any of example(s) 2, wherein the measurement metric for each beam pair is a RSRQ (Reference Signal Received Quality) for that beam pair, wherein the RSRQ for that beam pair is based on a ratio of a RSRP (Reference Signal Received Power) for that beam pair to the RSSI measurements of the distinct UE beam of that beam pair, and wherein the processing circuitry is further configured to measure the RSRP for each beam pair of the one or more beam pairs.

Example 4 comprises the subject matter of any variation of any of example(s) 1, wherein the measurement metric for each beam pair is a SINR (Signal-to-Interference-plus-Noise Ratio) for that beam pair, and wherein the processing circuitry is further configured to: measure, for each beam pair, a signal power of the SINR of that beam pair based on the UE beam and the associated NW beam of that beam pair; and measure, for each beam pair, an interference power of the SINR of that beam pair based on the UE beam of that beam pair.

Example 5 comprises the subject matter of any variation of any of example(s) 1-4, wherein the processing circuitry is configured to perform the interference measurements on a set of time resources.

Example 6 comprises the subject matter of any variation of any of example(s) 5, wherein the set of time resources comprise one or more selected subframes, wherein each selected subframe of the one or more selected subframes comprises no periodic reference signals.

Example 7 comprises the subject matter of any variation of any of example(s) 5, wherein the processing circuitry is further configured to select the set of time resources based on the one or more parameters.

Example 8 comprises the subject matter of any variation of any of example(s) 1-4, wherein the beam information report comprises a beam index of the associated NW beam for the at least one beam pair of the one or more beam pairs.

Example 9 comprises the subject matter of any variation of any of example(s) 8, wherein the beam information report comprises a beam index of the UE beam for the at least one beam pair of the one or more beam pairs.

Example 10 comprises the subject matter of any variation of any of example(s) 1-4, wherein the beam information report is a periodic report generated based at least in part on the one or more parameters.

Example 11 comprises the subject matter of any variation of any of example(s) 1-4, wherein the processing circuitry is configured to generate the beam information report based at least in part on a triggering event.

Example 12 comprises the subject matter of any variation of any of example(s) 5-6, wherein the processing circuitry is further configured to select the set of time resources based on the one or more parameters.

Example 13 comprises the subject matter of any variation of any of example(s) 1-7, wherein the beam information report comprises a beam index of the associated NW beam for the at least one beam pair of the one or more beam pairs.

Example 14 comprises the subject matter of any variation of any of example(s) 1-9, wherein the beam information report is a periodic report generated based at least in part on the one or more parameters.

Example 15 comprises the subject matter of any variation of any of example(s) 1-9, wherein the processing circuitry is configured to generate the beam information report based at least in part on a triggering event.

Example 16 is an apparatus configured to be employed in a next generation NodeB (gNB), comprising: a memory interface; and processing circuitry configured to: generate configuration signaling that indicates one or more parameters associated with at least one of channel measurements, interference measurements, or a beam information report; generate a set of beam reference signals for each of one or more TP (Transmission Point) beams; process the beam information report, wherein the beam information report comprises one or more interference-based measurement metrics for an associated beam pair and, for each of the one or more interference-based measurement metrics, an associated TP beam index that indicates a TP beam of the one or more TP beams for that associated beam pair; and send the one or more parameters to a memory via the memory interface.

Example 17 comprises the subject matter of any variation of any of example(s) 16, wherein each of the one or more interference-based measurement metrics is based at least in part on a RSSI (Received Signal Strength Indicator) of a UE beam of the associated beam pair for that interference-based measurement metric.

Example 18 comprises the subject matter of any variation of any of example(s) 17, wherein each of the one or more interference-based measurement metrics is a RSRQ (Reference Signal Received Quality) for the associated beam pair for that interference-based measurement metric, wherein the RSRQ for that associated beam pair is based on a ratio of a RSRP (Reference Signal Received Power) for that associated beam pair to the RSSI measurements of a UE beam of that associated beam pair.

Example 19 comprises the subject matter of any variation of any of example(s) 16, wherein each of the one or more interference-based measurement metric is a SINR (Signal-to-Interference-plus-Noise Ratio) for the associated beam pair for that interference-based measurement metric, wherein a signal power of the SINR for that associated beam pair is based on a UE beam of that beam pair and the TP beam for that beam pair; and wherein an interference power of the SINR for that associated beam pair based on the UE beam of that beam pair.

Example 20 comprises the subject matter of any variation of any of example(s) 16-19, wherein the interference-based measurement metric is based at least in part on interference measurements on a set of time resources.

Example 21 comprises the subject matter of any variation of any of example(s) 20, wherein the set of time resources comprise one or more data subframes that comprise no periodic reference signals.

Example 22 comprises the subject matter of any variation of any of example(s) 20, wherein the one or more parameters indicate the set of time resources.

Example 23 comprises the subject matter of any variation of any of example(s) 16-19, wherein the beam information report comprises, for each of the one or more interference-based measurement metrics, an associated UE beam index that indicates a UE beam for that associated beam pair.

Example 24 comprises the subject matter of any variation of any of example(s) 16-19, wherein the one or more parameters indicate a reporting period for the beam information report.

Example 25 is a machine readable medium comprising instructions that, when executed, cause a User Equipment to: receive configuration signaling indicating one or more parameters, wherein each of the one or more parameters is associated with at least one of channel measurements, interference measurements, or a beam information report; perform the interference measurements for each of one or more distinct UE beams; perform the channel measurements on a set of reference signals; calculate a measurement metric for each beam pair of one or more beam pairs based on the interference measurements and the channel measurements, wherein each beam pair comprises one of the one or more distinct UE beams and an associated TP (Transmission Point) beam; and transmit the beam information report comprising the measurement metric for at least one beam pair of the one or more beam pairs and a TP beam index for the TP beam of each beam pair of the at least one beam pair.

Example 26 comprises the subject matter of any variation of any of example(s) 25, wherein the interference measurements for each of the one or more distinct UE beams comprise RSSI (Received Signal Strength Indicator) measurements for each of the one or more distinct UE beams.

Example 27 comprises the subject matter of any variation of any of example(s) 26, wherein the measurement metric for each beam pair is a RSRQ (Reference Signal Received Quality) for that beam pair, wherein the RSRQ for that beam pair is based on a ratio of a RSRP (Reference Signal Received Power) for that beam pair to the RSSI measurements of the distinct UE beam of that beam pair, and wherein the instructions, when executed, further cause the UE to measure the RSRP for each beam pair of the one or more beam pairs.

Example 28 comprises the subject matter of any variation of any of example(s) 25, wherein the measurement metric for each beam pair is a SINR (Signal-to-Interference-plus-Noise Ratio) for that beam pair, and wherein the instructions, when executed, further cause the UE to: measure, for each beam pair, a signal power of the SINR of that beam pair based on the UE beam and the associated NW beam of that beam pair; and measure, for each beam pair, an interference power of the SINR of that beam pair based on the UE beam of that beam pair.

Example 29 comprises the subject matter of any variation of any of example(s) 25-28, wherein the interference measurements are performed on one or more selected data subframes, wherein each selected data subframe of the one or more selected data subframes comprises no periodic reference signals.

Example 30 comprises the subject matter of any variation of any of example(s) 25-28, wherein the one or more parameters indicate a set of time resources on which the interference measurements are performed.

Example 31 comprises the subject matter of any variation of any of example(s) 25-28, wherein the beam information report is a periodic report generated based at least in part on the one or more parameters.

Example 32 comprises the subject matter of any variation of any of example(s) 25-28, wherein the beam information report is generated based at least in part on a triggering event.

Example 33 is an apparatus configured to be employed in a User Equipment (UE), comprising: means for receiving configuration signaling indicating one or more parameters, wherein each of the one or more parameters is associated with at least one of channel measurements, interference measurements, or a beam information report; means for performing the interference measurements for each of one or more distinct UE beams; means for performing the channel measurements on a set of reference signals; means for calculating a measurement metric for each beam pair of one or more beam pairs based on the interference measurements and the channel measurements, wherein each beam pair comprises one of the one or more distinct UE beams and an associated TP (Transmission Point) beam; and means for transmitting the beam information report comprising the measurement metric for at least one beam pair of the one or more beam pairs and a TP beam index for the TP beam of each beam pair of the at least one beam pair.

Example 34 comprises the subject matter of any variation of any of example(s) 33, wherein the interference measurements for each of the one or more distinct UE beams comprise RSSI (Received Signal Strength Indicator) measurements for each of the one or more distinct UE beams.

Example 35 comprises the subject matter of any variation of any of example(s) 34, wherein the measurement metric for each beam pair is a RSRQ (Reference Signal Received Quality) for that beam pair, wherein the RSRQ for that beam pair is based on a ratio of a RSRP (Reference Signal Received Power) for that beam pair to the RSSI measurements of the distinct UE beam of that beam pair, and wherein the apparatus further comprises means for causing the UE to measure the RSRP for each beam pair of the one or more beam pairs.

Example 36 comprises the subject matter of any variation of any of example(s) 33, wherein the measurement metric for each beam pair is a SINR (Signal-to-Interference-plus-Noise Ratio) for that beam pair, and wherein the apparatus further comprises: means for measuring, for each beam pair, a signal power of the SINR of that beam pair based on the UE beam and the associated NW beam of that beam pair; and means for measuring, for each beam pair, an interference power of the SINR of that beam pair based on the UE beam of that beam pair.

Example 37 comprises the subject matter of any variation of any of example(s) 33-37, wherein the interference measurements are performed on one or more selected data subframes, wherein each selected data subframe of the one or more selected data subframes comprises no periodic reference signals.

Example 38 comprises the subject matter of any variation of any of example(s) 33-37, wherein the one or more parameters indicate a set of time resources on which the interference measurements are performed.

Example 39 comprises the subject matter of any variation of any of example(s) 33-37, wherein the beam information report is a periodic report generated based at least in part on the one or more parameters.

Example 40 comprises the subject matter of any variation of any of example(s) 33-37, wherein the beam information report is generated based at least in part on a triggering event.

Example 41 comprises an apparatus comprising means for executing any of the described operations of examples 1-40.

Example 42 comprises a machine readable medium that stores instructions for execution by a processor to perform any of the described operations of examples 1-40.

Example 43 comprises an apparatus comprising: a memory interface; and processing circuitry configured to: performing any of the described operations of examples 1-40.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a User Equipment (UE), comprising:

a memory interface; and processing circuitry configured to:

determine parameters indicated in a configuration signaling received from a base station (BS), the parameters are associated with an interference measurement and a beam information report, respectively;

perform the interference measurement as dictated by the respective parameters for each of one or more distinct UE beams, wherein the interference measurement captures interference levels from neighboring transmission points (TPs);

calculate a measurement metric for each beam pair of one or more beam pairs based on the interference measurement, wherein each beam pair comprises one of the one or more distinct UE beams and an associated NW (Network) beam; and generate the beam information report as dictated by the respective parameters, wherein the beam information report comprises the measurement metric for at least one beam pair of the one or more beam pairs;

wherein the processing circuitry is configured to perform the interference measurements on a set of time resources, wherein the set of time resources comprise one or more selected subframes; and wherein each selected subframe of the one or more selected subframes comprises no periodic reference signals.

2. The apparatus of claim 1, wherein the interference measurement for each of the one or more distinct UE beams comprises an RSSI (Received Signal Strength Indicator) measurement for each of the one or more distinct UE beams.

3. The apparatus of claim 2, wherein the measurement metric for each beam pair is a RSRQ (Reference Signal Received Quality) for that beam pair, wherein the RSRQ for that beam pair is based on a ratio of a RSRP (Reference Signal Received Power) for that beam pair to the RSSI measurement of the distinct UE beam of that beam pair, and wherein the processing circuitry is further configured to measure the RSRP for each beam pair of the one or more beam pairs.

4. The apparatus of claim 1, wherein the measurement metric for each beam pair is a SINR (Signal-to-Interference-plus-Noise Ratio) for that beam pair, and wherein the processing circuitry is further configured to:

measure, for each beam pair, a signal power of the SINR of that beam pair based on the UE beam and the associated NW beam of that beam pair; and measure, for each beam pair, an interference power of the SINR of that beam pair based on the UE beam of that beam pair.

5. The apparatus of claim 1, wherein the processing circuitry is further configured to select the set of time resources based on the parameters.

6. The apparatus of claim 1, wherein the beam information report comprises a beam index of the associated NW beam for the at least one beam pair of the one or more beam pairs.

7. The apparatus of claim 6, wherein the beam information report comprises a beam index of the UE beam for the at least one beam pair of the one or more beam pairs.

8. The apparatus of claim 1, wherein the beam information report is a periodic report generated based at least in part on the parameters.

9. The apparatus of claim 1, wherein the processing circuitry is configured to generate the beam information report based at least in part on a triggering event.

10. An apparatus configured to be employed in a base station (BS), comprising:

a memory interface; and processing circuitry configured to:

generate configuration signaling that indicates parameters associated with an interference measurement and a beam information report, respectively;

generate a set of beam reference signals for each of one or more TP (Transmission Point) beams; and process a beam information report as dictated by the respective parameters, wherein the beam information report comprises one or more interference-based measurement metrics for an associated beam pair and, for each of the one or more interference-based measurement metrics, an associated TP beam index that indicates a TP beam of the one or more TP beams for that associated beam pair; wherein the one or more interference-based measurement metrics comprise measurement metrics that are determined based on the interference measurement that is dictated by the respective parameters indicated as part of the configuration signaling, wherein the interference measurement captures interference levels from neighboring transmission points (TPs);

wherein the one or more interference-based measurement metrics are based at least in part on the interference measurement on a set of time resources; and wherein the set of time resources comprise one or more data subframes that comprise no periodic reference signals.

11. The apparatus of claim 10, wherein each of the one or more interference-based measurement metrics is based at least in part on an RSSI (Received Signal Strength Indicator) measurement of a UE beam of the associated beam pair for that interference-based measurement metric.

12. The apparatus of claim 11, wherein each of the one or more interference-based measurement metrics is a RSRQ (Reference Signal Received Quality) for the associated beam pair for that interference-based measurement metric, wherein the RSRQ for that associated beam pair is based on a ratio of a RSRP (Reference Signal Received Power) for that associated beam pair to the RSSI measurement of a UE beam of that associated beam pair.

13. The apparatus of claim 10, wherein each of the one or more interference-based measurement metrics is an SINR (Signal-to-Interference-plus-Noise Ratio) for the associated beam pair for that interference-based measurement metric, wherein a signal power of the SINR for that associated beam pair is based on a UE beam of that beam pair and the TP beam for that beam pair; and wherein an interference power of the SINR for that associated beam pair based on the UE beam of that beam pair.

14. The apparatus of claim 10, wherein the parameters indicate the set of time resources.

15. The apparatus of claim 10, wherein the beam information report comprises, for each of the one or more interference-based measurement metrics, an associated UE beam index that indicates a UE beam for that associated beam pair.

16. The apparatus of claim 10, wherein the parameters indicate a reporting period for the beam information report.

17. A non-transitory machine readable medium comprising instructions that, when executed, cause a User Equipment (UE) to:

receive configuration signaling indicating parameters from a base station (BS), wherein the parameters are associated with a channel measurement, an interference measurement and a beam information report, respectively;

perform the interference measurement as dictated by the respective parameters for each of one or more distinct UE beams, wherein the interference measurement captures interference levels from neighboring transmission points (TPs);

wherein the interference measurement is performed on one or more selected data subframes, wherein each selected data subframe of the one or more selected data subframes comprises no periodic reference signals, wherein the parameters indicate a set of time resources on which the interference measurement is performed;

perform the channel measurement as dictated by the respective parameters on a set of reference signals;

calculate a measurement metric for each beam pair of one or more beam pairs based on the interference measurement and the channel measurement, wherein each beam pair comprises one of the one or more distinct UE beams and an associated TP (Transmission Point) beam; and transmit the beam information report as dictated by the respective parameters, wherein the beam information report comprises the measurement metric for at least one beam pair of the one or more beam pairs and a TP beam index for the TP beam of each beam pair of the at least one beam pair.

18. The non-transitory machine readable medium of claim 17, wherein the interference measurement for each of the one or more distinct UE beams comprises an RSSI (Received Signal Strength Indicator) measurement for each of the one or more distinct UE beams.

19. The non-transitory machine readable medium of claim 18, wherein the measurement metric for each beam pair is a RSRQ (Reference Signal Received Quality) for that beam pair, wherein the RSRQ for that beam pair is based on a ratio of a RSRP (Reference Signal Received Power) for that beam pair to the RSSI measurement of the distinct UE beam of that beam pair, and wherein the instructions, when executed, further cause the UE to measure the RSRP for each beam pair of the one or more beam pairs.

20. The non-transitory machine readable medium of claim 17, wherein the measurement metric for each beam pair is a SINR (Signal-to-Interference-plus-Noise Ratio) for that beam pair, and wherein the instructions, when executed, further cause the UE to:

measure, for each beam pair, a signal power of the SINR of that beam pair based on the UE beam and the associated TP beam of that beam pair; and measure, for each beam pair, an interference power of the SINR of that beam pair based on the UE beam of that beam pair.

21. The non-transitory machine readable medium of claim 17, wherein the beam information report is a periodic report generated based at least in part on the parameters.

22. The non-transitory machine readable medium of claim 17, wherein the beam information report is generated based at least in part on a triggering event.

* * * * *